United States Patent [19]
Kingsbury

[11] Patent Number: 6,055,617
[45] Date of Patent: Apr. 25, 2000

[54] VIRTUAL ADDRESS WINDOW FOR ACCESSING PHYSICAL MEMORY IN A COMPUTER SYSTEM

[75] Inventor: Brent A. Kingsbury, Beaverton, Oreg.

[73] Assignee: Sequent Computer Systems, Inc., Beaverton, Oreg.

[21] Appl. No.: 08/920,667

[22] Filed: Aug. 29, 1997

[51] Int. Cl.$^7$ .................................................. G06F 12/10
[52] U.S. Cl. .............................. 711/203; 711/6; 711/165; 711/206; 711/209
[58] Field of Search ..................................... 711/165, 206, 711/6, 2, 5, 148, 153, 173, 202, 203, 205, 207, 208, 209

[56] References Cited

U.S. PATENT DOCUMENTS

| | | |
|---|---|---|
| 5,095,420 | 3/1992 | Eilert et al. . |
| 5,159,677 | 10/1992 | Rubsam et al. . |
| 5,377,337 | 12/1994 | Antognini et al. . |
| 5,479,627 | 12/1995 | Khailidi et al. .......................... 711/205 |
| 5,581,724 | 12/1996 | Belsan et al. ............................ 711/114 |
| 5,628,023 | 5/1997 | Bryant et al. . |
| 5,652,854 | 7/1997 | Wong ................................... 711/206 |
| 5,737,769 | 4/1998 | Kim ..................................... 711/202 |
| 5,860,144 | 1/1999 | Frank et al. ............................ 711/206 |
| 5,893,166 | 4/1999 | Frank et al. ............................ 711/163 |

OTHER PUBLICATIONS

Robinson, "Dr. Dobb's Toolbook of 80286/80386 Programming," chapter 13, pp. 219–243 (1988).

Primary Examiner—Hiep T Nguyen
Attorney, Agent, or Firm—Klarquist Sparkman Campbell Leigh & Whinston, LLP

[57] ABSTRACT

Physical memory is accessed by associating identified memory with a window of virtual address space whose size and location are specified by an application program. In the typical application of the invention, the virtual window is smaller in size than the associated memory. One or more virtually-windowed address translations are then established between portions of the windowed address space and the corresponding portions of the physical memory. Additional physical memory can be accessed with the same virtual address space by establishing new virtually-windowed address translations with other portions of the physical memory. In the preferred embodiment of the invention, the physical memory is identified, attached to the virtual window, and the address translation is established by the computer's operating system in response to a series of system calls from an application program. These calls permit the application program such as a database program to access a physical data space that is larger in size than the program's virtual address space.

24 Claims, 8 Drawing Sheets

VIRTUAL ADDRESS WINDOW FOR ACCESSING PHYSICAL MEMORY IN A COMPUTER SYSTEM

FIELD OF THE INVENTION

This invention relates generally to memory management techniques of computer operating systems. More specifically, this invention relates to a technique for enabling an application program to efficiently address more physical memory than would ordinarily be possible with the virtual address space supported by the processor architecture upon which the application is running.

BACKGROUND OF THE INVENTION

One of the primary functions of an operating system is to manage the memory resources of the computer system efficiently. Each computer system has a high-speed, randomly accessible primary memory, also known as main memory, physical memory, core, or simply as memory. Its access time is on the order of nanoseconds. A program may directly reference information (code or data) that is resident in main memory. Such memory is relatively expensive and therefore limited in size. The computer system uses a number of secondary storage devices such as disks to store information that does not fit into main memory. Access to such devices is much slower than to main memory and requires explicit action on the part of the operating system. The memory management subsystem in the operating system's kernel is responsible for distributing information between main memory and secondary storage. It interacts closely with a hardware component called the memory management unit (MMU), which is responsible for getting code and data to and from main memory.

Memory management techniques use virtual memory to run application programs (i.e., processes) that typically exceed in size the physical memory available to them. This situation can arise, for example, where more than one program is resident in memory or where a single program exceeds the amount of physical memory in the computer system. With virtual memory the program is given the illusion that it has a large main memory at its disposal, although the actual physical memory may be smaller. This requires the notion of an address space as distinct from physical memory locations. The program generates references to code and data in its address space (also referred to as "virtual address space," "process address space," or "process virtual address space")and these references must be translated to physical locations in main memory. The hardware and software cooperate to bring the information into main memory when it is needed for processing by the program and to perform the virtual-to-physical address translation for each access.

Most memory management techniques today use demand paging for virtual memory. In a demand-paged scheme, both physical memory and process virtual address space are divided into fixed-sized pages, and pages of the address space are brought into and out of memory as required. A page of physical memory is often called a page frame (or a physical page). Several processes may be active at any one time, and physical memory, often being smaller than the virtual address space of all resident processes, may contain just some of the pages of each process. Process addresses are virtual and are divided by the hardware into a page number and an offset in the page. The hardware in conjunction with the operating system translates the virtual page number in the process address space to a physical page frame number and accesses the appropriate location in main memory. If the required page is not in memory, the process generates a page fault, indicating to the operating system that the page must be brought from secondary storage into memory.

Described above is the typical situation, where the virtual address space of even a single process may exceed the size of the physical memory. But in some situations, the physical memory can exceed the virtual address space. Programs such as database applications with large data caches can have a data cache space that is larger than the virtual address space supported by the processor running the program. For example, the PentiumPro® microprocessor from Intel Corp. supports 36 bits of physical addressing (64 gigabytes) but offers only 32 bits of virtual address space (4 gigabytes) to maintain compatibility with previous processors supporting the same instruction set. This combination of a 32-bit virtual address space and a physical address space of 36 bits means that no single process using conventional memory management techniques can simultaneously address all possible physical memory supported by the processor. Yet it is the existence of these very large physical memories that allows database programs with large data caches to exist, keeping a sizeable amount of information immediately accessible in physical memory rather than stored with delayed access on disk.

An objective of the invention, therefore, is to provide a method for an application program to rapidly access physical memory that is far larger than the program's virtual address space. More specifically, an objective of the invention is to make a multi-gigabyte data cache entirely accessible in main memory to a database program, even though the program's conventional address space is smaller than the required memory. By providing such access, the time necessary for the program to access the data is reduced by several orders of magnitude. Although the current use of the invention is in support of multi-gigabyte caches, the invention can be used wherever a data space exists that is larger than the process virtual address space.

SUMMARY OF THE INVENTION

A computer-implemented method in accordance with the invention allows an application program to access physical memory through a window of virtual address space whose size and location are specified by the program. Identified physical memory is associated with a virtual window, and a virtually-windowed address translation is then established between a portion of the windowed virtual address space and a portion of the identified physical memory. In a typical application, the method is used to provide access to physical memory that is larger in size than the program's virtual address space.

In one aspect of the invention, a portion of the program's virtual address space can be used to access different portions of physical memory by changing the address translations so that the virtual address space translates to other portions of physical memory. In another aspect of the invention, the physical memory is identified through a shared memory segment, which is then locked into the physical memory of the computer system to prevent any physical pages of the segment from being swapped or paged out of memory.

In the preferred embodiment of the invention, the physical memory is identified, attached to the virtual window and the address translations are established by the computer's operating system in response to a series of system calls from an application program. These calls permit a program such as a database program to access physical memory that is larger in size than the program's virtual address space.

The invention has particular applicability to multiprocessor systems that support database programs with large data caches exceeding the size of the process virtual address space. The computer systems include large amounts of physical memory in which the data caches may be stored for immediate access.

The foregoing and other objects, features, and advantages of the invention will become more apparent from the following detailed description of a preferred embodiment which proceeds with reference to the accompanying drawings.

DETAILED DESCRIPTION OF A PREFERRED EMBODIMENT

The invention can be implemented on any type of computer system whose operating system supports virtual memory. In the preferred embodiment, the invention is implemented in a multiprocessor computer system described below in which the size of the physical memory is larger than the virtual address space supported by the CPUs within the computer system. The invention is intended to support programs that would benefit from a memory-resident data space larger than the virtual space afforded by the processor or operating system implementation. However, the invention can be used just as well in single CPU computer systems. The following description should be understood to be simply a preferred embodiment of the invention and not a limitation on its applicability or the scope of the patent's claims.

Figure 1:
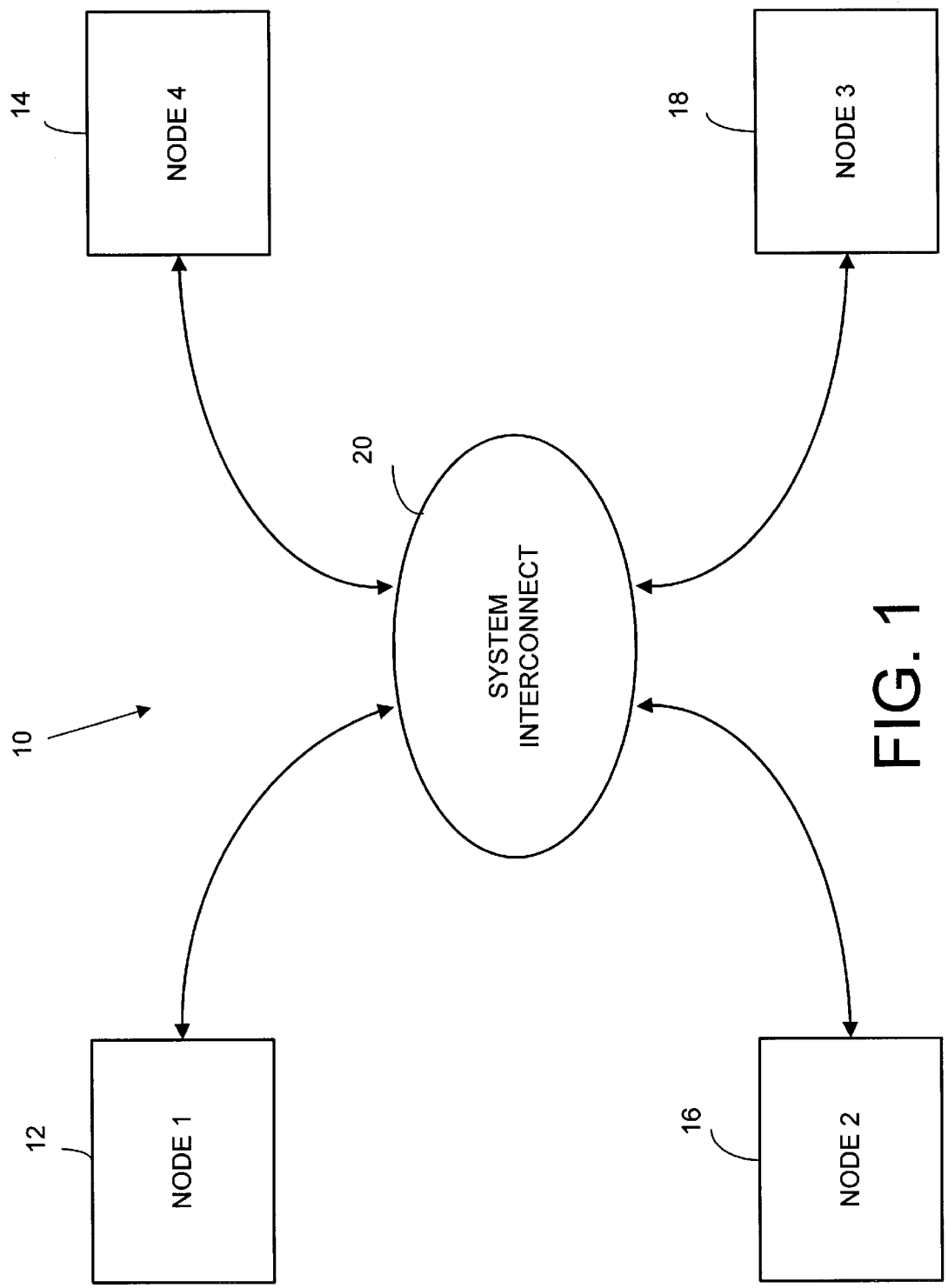
FIG. 1 is a block diagram of a multinode multiprocessor computer system on which the invention may be implemented.

FIG. 1 is a block diagram of a multinode, multiprocessor computer system 10 in accordance with the invention. System 10 uses a computer architecture based on Distributed-Shared Memory (DSM) and is a non-uniform memory access (NUMA) machine. Four nodes 12, 14, 16, and 18 are shown connected by a system interconnect 20 (i.e., a network) that permits any node to communicate with any other node. Specifically, the purpose of system interconnect 20 is to allow processors in any node to access the memory resident in any other node. System interconnect 20 is a switch-based network that uses the Scalable Coherent Interface (SCI) interconnection mechanism. SCI is an IEEE-approved standard, or protocol (1596), well documented in a number of publications including *IEEE Std* 1596-1992 (Aug. 2, 1993) and *Multiprocessor Interconnection Using SCI*, a Master Thesis by Ivan Tving, DTH ID-E 579 (1994), both of which are hereby incorporated by reference. Additional background information on multiprocessor systems in general and NUMA machines in particular can be found in a number of publications including *Computer Architecture: A Quantitative Approach* (2nd Ed. 1996), by D. Patterson and J, Hennessy, which is hereby incorporated by reference.

The physical links of interconnect 20 provide high bandwidth and low latency and are scalable to allow for the addition of more nodes. Links that meet these requirements typically include point-to-point interconnects with a present data throughput of one gigabyte/second or greater. The links can be configured in any number of suitable ways for connecting nodes 12, 14, 16, and 18, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, *Computer Sciences Technical Report* #1058, University of Wisconsin - Madison, which is hereby incorporated by reference.

Node Overview

Figure 2:
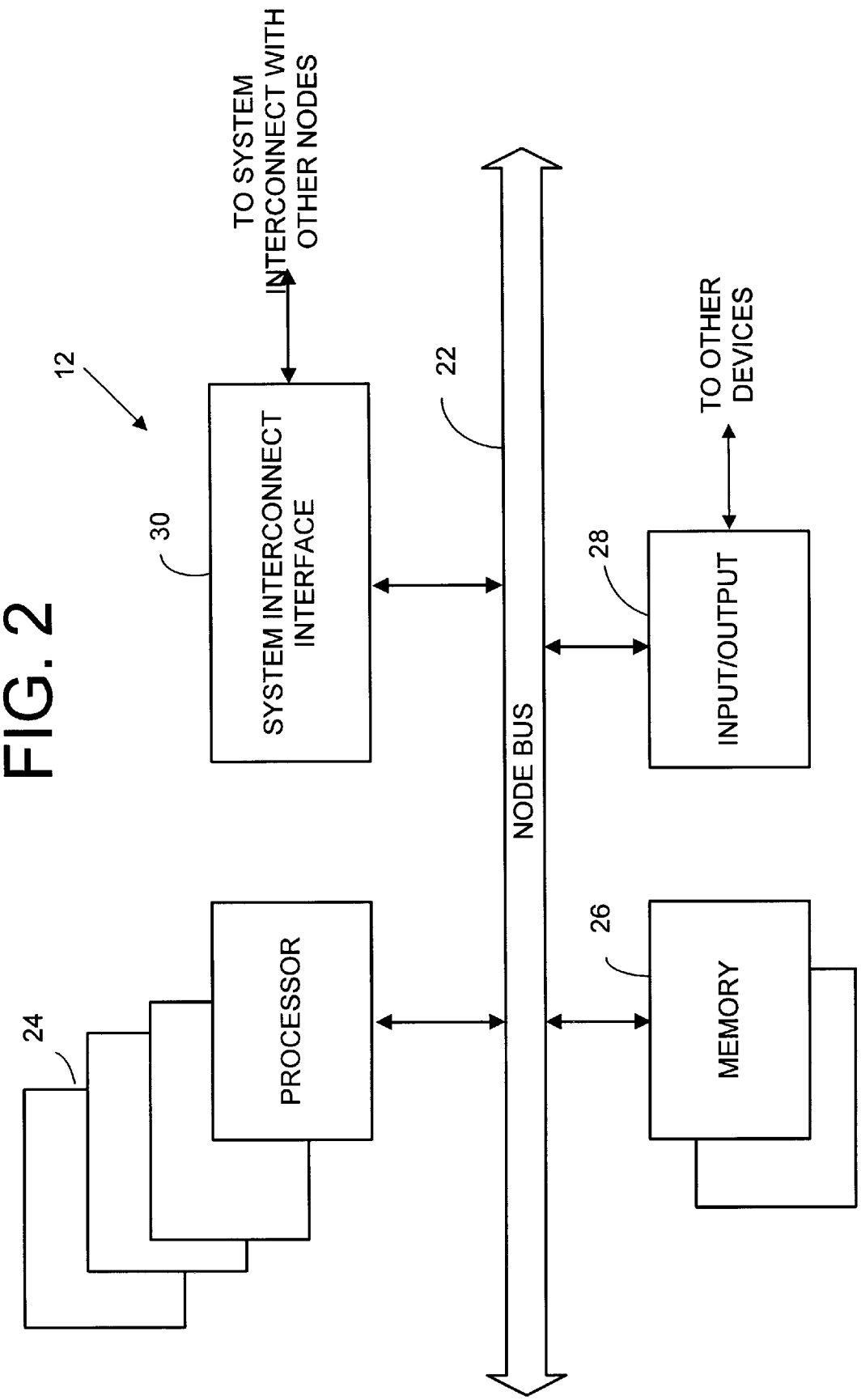
FIG. 2 is a block diagram of one of the nodes of the computer system of FIG. 1.

A block diagram of node 12 on system 10 is shown in FIG. 2. The node includes a conventional symmetrical multiprocessor (SMP) node bus 22 for connecting multiple data processors 24 to local memory 26. For clarity, the nodes may be referred to as home nodes or remote nodes in certain circumstances. A home node is one whose local memory stores a memory block of interest (i.e., the physical address of the memory block falls within the address range supported by the local memory or cache); all of the other nodes are then remote nodes with respect to that memory block. Additionally, a node may be a requesting node or a responding node. A requesting node is one requesting data; a responding node is one furnishing such data. Input/output (I/O) 28, which is also connected to bus 22, connects the node to devices outside computer system 10 for communicating information between the computer system and the outside world. I/O 28 may be of conventional design and includes means for connecting the node (and hence system 10) to personal computers, local area networks, etc., that wish to utilize the power of the multinode computer system. The I/O 28 may also allow for connection to peripheral devices, such as floppy disks, hard disks, CD-ROMs etc. To connect node 12 to the other nodes in the system, the node includes a system interconnect interface 30. The system interconnect interface forms part of interconnect 20 along with the physical links between nodes and the same devices on the other nodes of the computer system 10. In the present embodiment, interface 30 is constructed to implement the SCI standard for data communication between the nodes, allowing a processor on one node to access data stored on another node. The interface 30 also contains a remote cache in the present embodiment, although this combination is not required for the invention. The remote cache could also be separate from the system interconnect interface.

Operating System Overview

Figure 3:
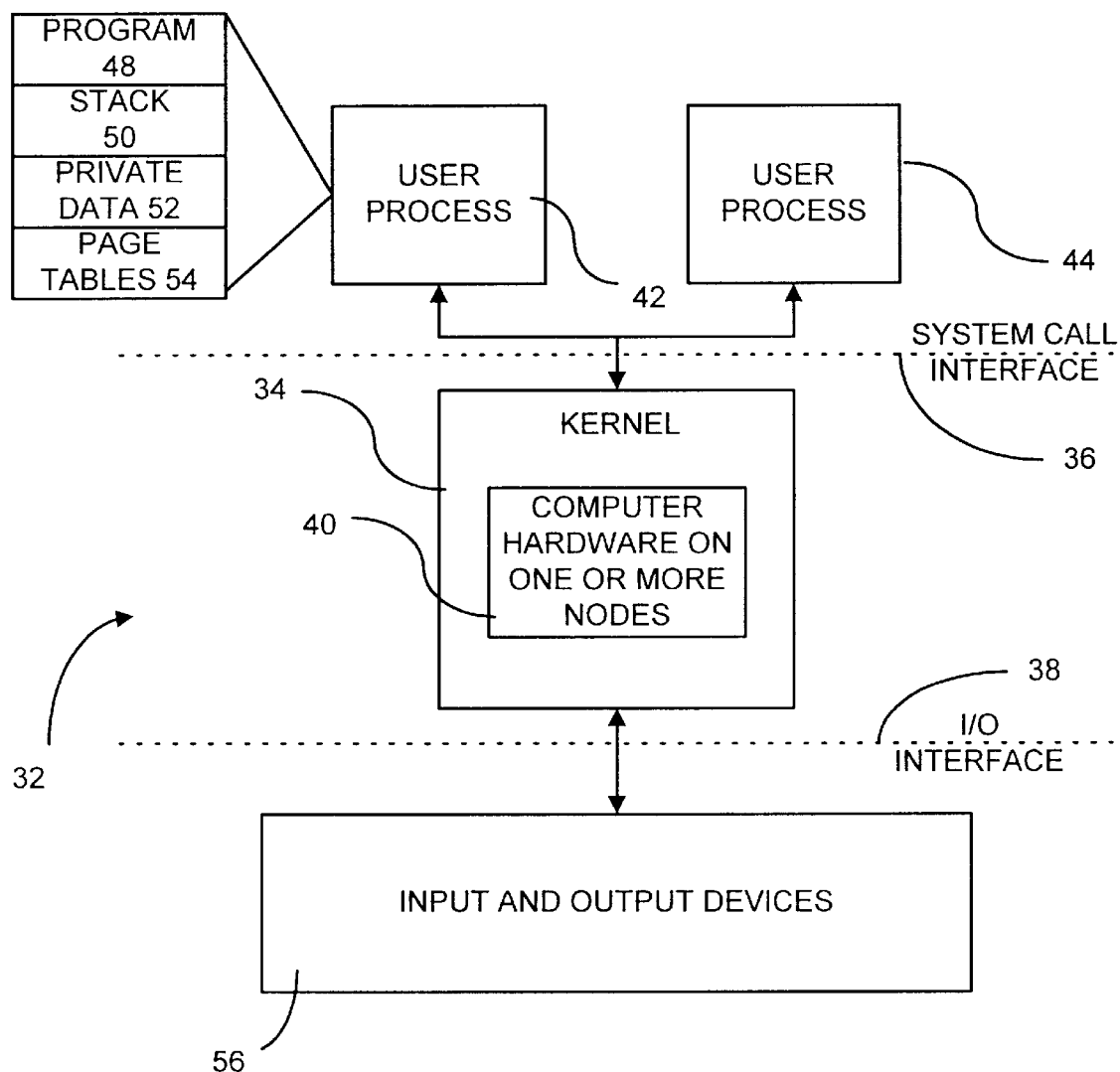
FIG. 3 is a block diagram of the relationship among processes, the computer's operating system and the hardware of the computer system of FIG. 1.

FIG. 3 shows an operating system 32 for computer system 10, which includes a kernel 34, a system call interface 36 and an I/O interface 38. The same operating system environment exists on the other nodes. The illustrated operating system is a UNIX-based operating system, such as DYNIX/ptx, BSD, SVR4, UnixWare, PC UNIX, etc. Other UNIX-based operating systems or other operating systems generally may also be used. For general information on UNIX-based operating systems, see Bach, M. J., *The Design of the UNIX Operating System,* Prentice-Hall, 1986; Vahalia, U., *Unix Internals: The New Frontier,* Prentice-Hall, 1996; McKusick, M., et al., *The Design and Implementation of the 4.4 BSD Operating System,* Addison-Wesley, 1996, which are all hereby incorporated by reference. Kernel 34 (which is the heart of operating system 32) is a program stored in memory 26 on one or more nodes. Memory 26, processors 24, and other hardware shown in FIG. 2 are used for running the kernel 34 and are shown generally as computer hardware 40. Kernel 34 is responsible for controlling the computer system's resources and scheduling user requests so that each user request receives its fair share of the system resources. A system resource can be, for example, an I/O device (e.g., disk drive, tape drive, CD ROM, etc.), a shared memory segment, a file, a process, a processor, etc.

User requests are generated by one or more user processes 42 and 44 that run on system 10. User process 42 includes a part of an application program 48 (i.e., instructions) and an execution environment for running the program. For example, process 42 includes several components, such as a stack 50, private data 52 for storing local variables, and page tables 54 used to define physical memory associated with the process. The page table for a process may consist of a hierarchy of such tables, and both single and multi-level page tables are represented by page table 54. Process 44 includes a similar environment to that of process 42. Although two user processes are shown, any number of processes may be run at one time on the node. The user processes make requests to kernel 34 through system calls which are passed to the kernel by system call interface 36. Processes execute in parallel to the extent they can be run concurrently on the different processors of system 10.

Kernel 34 accesses I/O devices 56 through I/O interface 38. For example, if user process 42 requests information from a disk drive (not shown) included within I/O devices 56, user process 42 makes a system call to operating system 32. Operating system 32 uses I/O interface 38 to retrieve the information from the disk drive and returns the information to user process 42.

This embodiment of the invention uses several system calls by an application program to kernel 34 and its responses to provide access to physical memory that is typically larger than the virtual address space of a single program. Two of the system calls, shmget and shmatvw, and the kernel's associated functions are modified forms of known UNIX system calls and functions. The third system call, virtwin, and related kernel functionality are entirely new additions to an operating system.

The Overall Method for Address Translation

Figure 4:
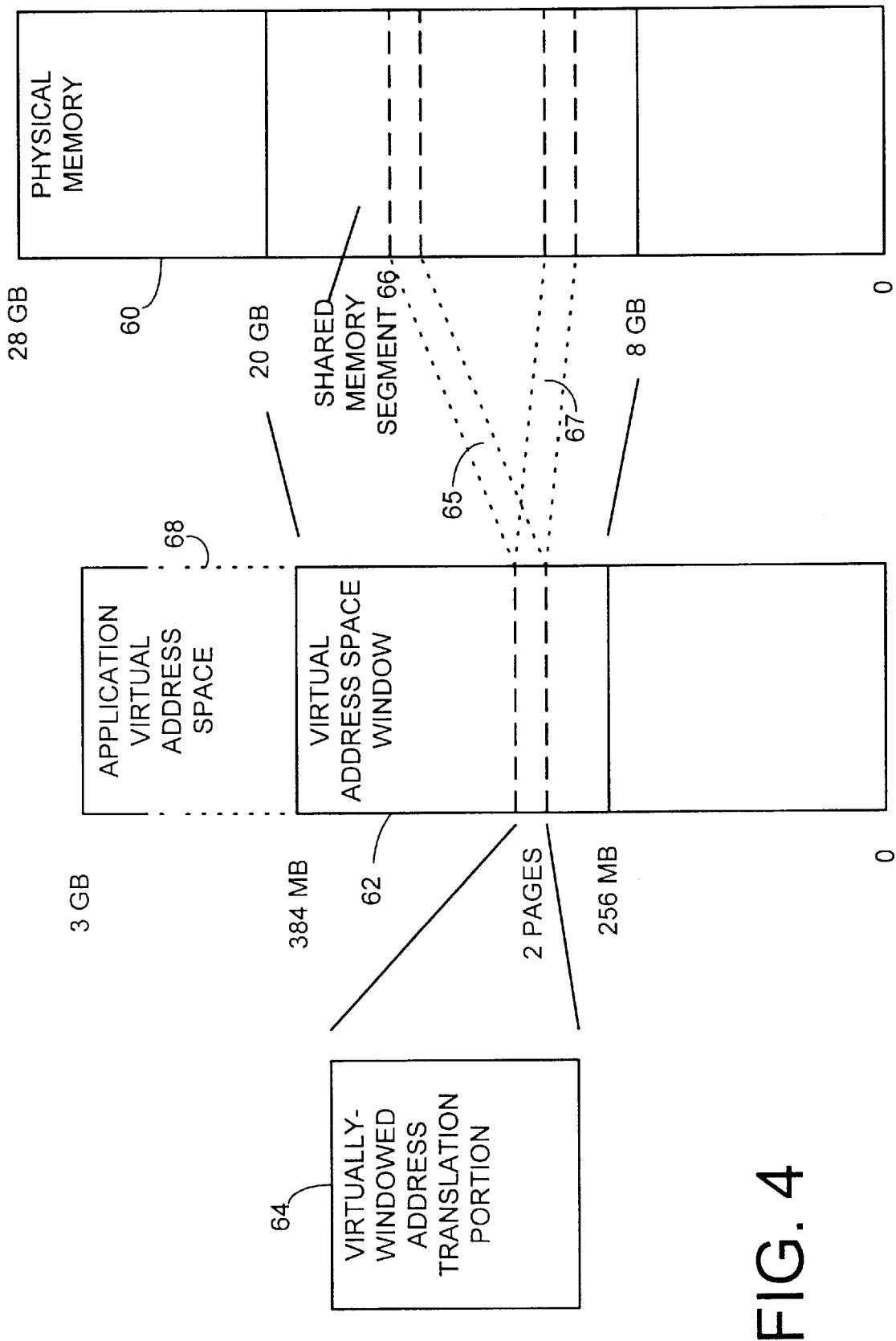
FIG. 4 is a block diagram of the relationship among physical memory, a virtual address space window, and an example showing two pages of virtual address space being redefined within the virtual address space window to map a different portion of the application data cache in physical memory in accordance with the invention.

FIG. 4 is a block diagram of the relationship among physical memory 60, a virtual address space window 62, and an example of a virtually-windowed address translation portion 64 in accordance with the invention. Window 62 and portion 64 are defined by kernel data structures as part of the program's (i.e., process's) execution state. In the preferred embodiment, these data structures keep track of the mapping between a process's virtual address space and physical memory. This relationship is maintained on a per-process basis in the process's page table. Physical memory 60 is shown as being 28 gigabytes in size as an example, with physical addresses ranging from 0 to 28 gigabytes minus 1. Within the physical memory is shown a means for identifying a portion of physical memory such as an associated shared memory segment 66. In the example, the shared memory segment is 12 gigabytes in size and occupies physical addresses 8 gigabytes up to 20 gigabytes. The virtual address space window 62 is part of the application virtual address space 68, which may be as much as 3 gigabytes in size in system 10. The window 62, which in this example is 128 megabytes in size, is associated with the 12 gigabyte shared memory segment 66. (It will be understood, of course that the physical memory attached to the virtual window 62 need not be physically contiguous; it is shown that way in FIG. 4 for the purposes of this example.) The virtual address space (as well as the physical address space) is divided into blocks known as pages, which are of a specified size such as 4 kilobytes. FIG. 4 includes an example of two pages of the virtual address space window 62 forming a portion 64 of interest, which translates the specified virtual addresses within the contained virtual pages to physical addresses.

Figure 5:
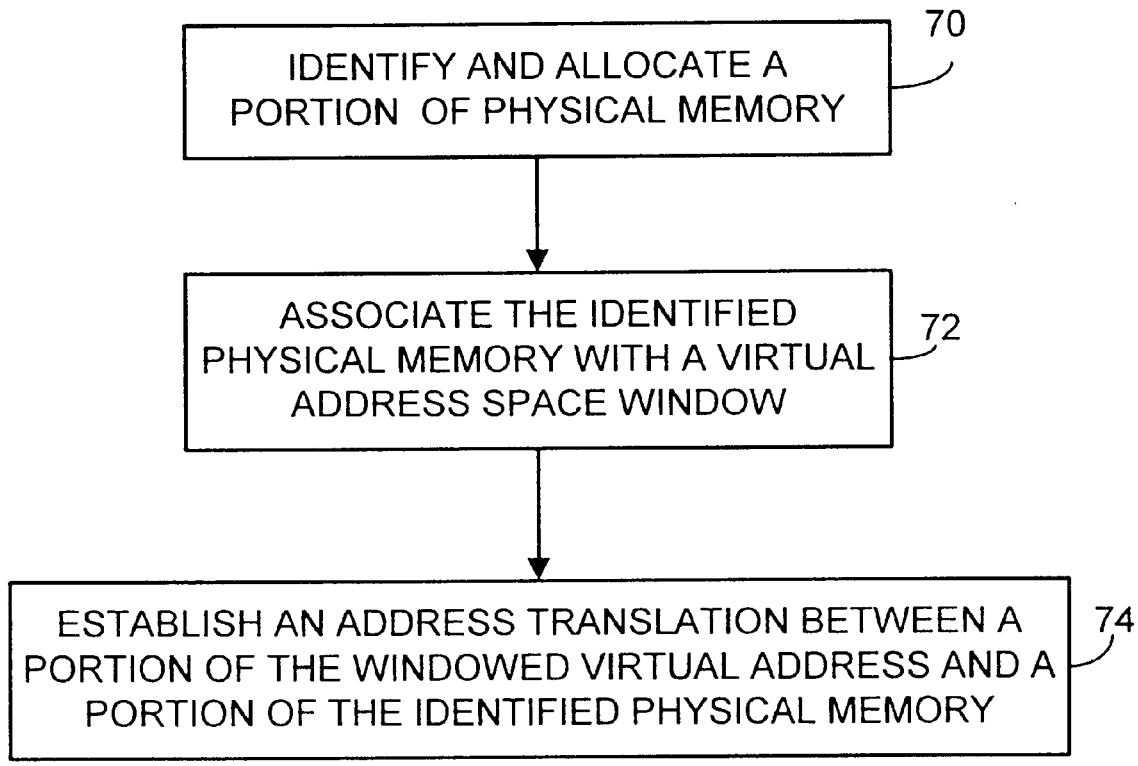
FIG. 5 is a flow chart of an overall method according to the invention for an application program to access physical memory space larger than the process's virtual address space.

FIG. 5 is a flow chart of an overall method according to the invention for an application program via a process to access physical memory. In the present embodiment, the method is executed by operating system 32 in response to a series of system calls from processes within an application. However, from this description it will be apparent to those of skill in the art that the method may be implemented in any number of equivalent ways.

The overall method has three basic steps, which are hereafter described with respect to the example of FIG. 4. In a first step 70, physical memory that is to be accessed through a virtual address space window is allocated and identified. This physical memory is identified through some means such as an associated shared memory segment 66 which, upon its creation, includes an identifier for accessing the segment. In a second step 72, a virtual address space window whose size and/or location are specified by an application program is created and associated with the identified physical memory. (In the preferred embodiment, as will be described, both the size and location of the virtual address space window are specified. However, either of the requirements may be specified alone if desired.) In FIG. 4, this association means that the virtual address space window 62, which is only 128 megabytes in length, is tied to the shared memory segment 66, which is 12 gigabytes in length. The window 62 is aptly named because it allows the 128 megabytes within it to simultaneously address any 128 megabytes within the shared memory segment. In a third step 74, an address translation is established between a portion of the windowed virtual address in window 62, such as portion 64, and a portion of physical memory 60 associated with shared memory segment 66, such as portion 65 or 67. This translation is a one-to-one mapping, with each virtual address in the window portion mapped to a specific physical address in memory 60.

The third step can be repeated any number of times to establish address translations between one set of virtual addresses and different portions of physical memory. This is illustrated in FIG. 4 by the two pairs of dashed lines 65 and 67 between window 62 and physical memory 60. Each pair of dashed lines represent a different portion 65, 67 of physical memory mapped by the two pages within portion 64. In this way, a smaller virtual address space can access a larger physical address space by changing the address translations. Moreover, a number of portions 64 can be created within window 62. Or one portion 64 may be chosen to include the entire window 62.

Identifying and Allocating the Physical Memory

Figure 6:
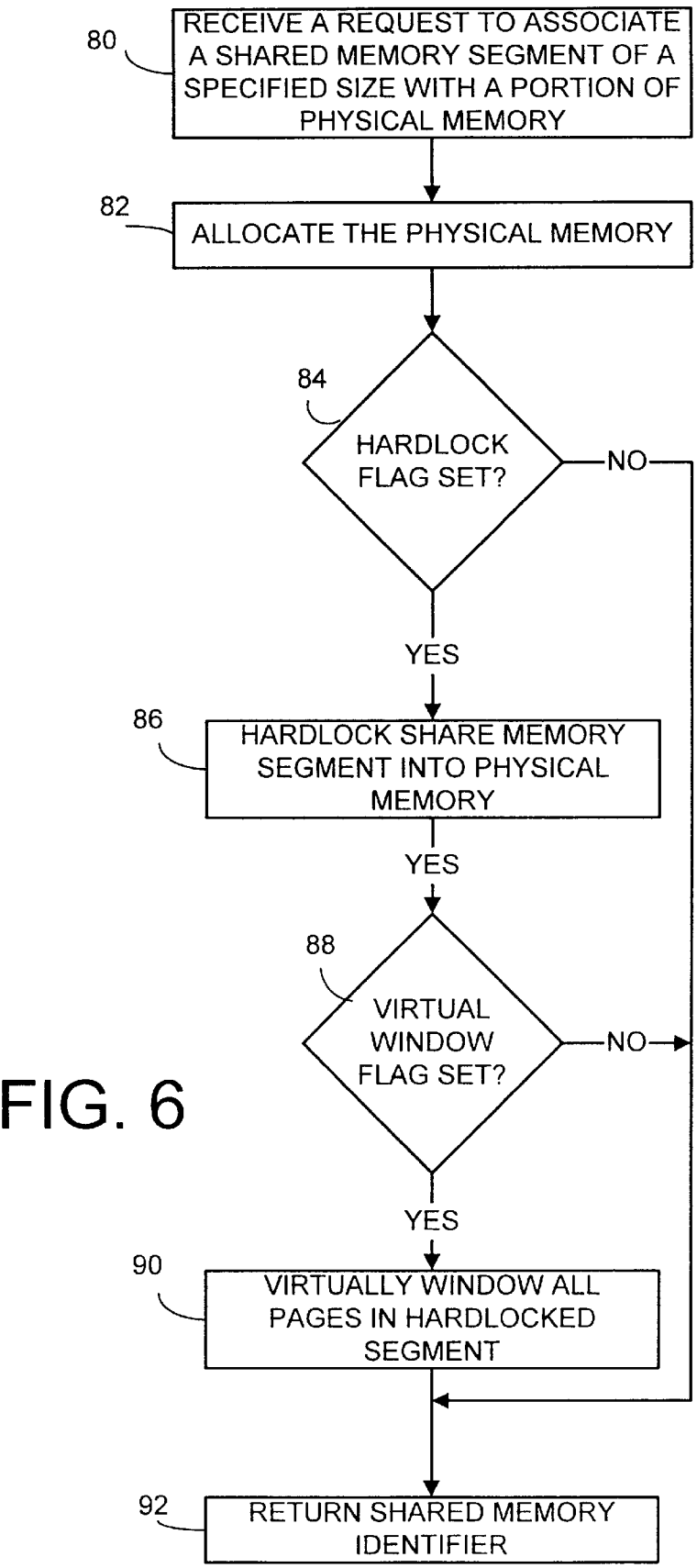
FIG. 6 is a flow chart showing in more detail a preferred method for carrying out the identifying step of FIG. 5.

FIG. 6 is a flow chart showing in more detail a preferred method for carrying out the identifying step 70 of FIG. 5. The memory is allocated (step 82) in response to a system call such as the UNIX call shmget to operating system 32 to associate a shared memory segment of a specified size such as segment 66 with a portion of physical memory (step 80). This system call allows a process to create a shared memory region and takes the following form:

int shmget (key_t key, int size, int shmflg)

or, in a variation that permits a subset of nodes of system 10 to be identified as the location for the physical memory:

int shmgetq (key_t key, int size, int shmflg, quadset_t *qds)

where the parameter qds identifies a specified group of nodes from which the physical memory must be allocated. For the purposes of this description, both system calls are collectively hereafter referred to as shmget unless stated otherwise.

The invention extends the standard System V implementation of shmget by the addition of two unique shared memory flags in the shmflg parameter. The first of these is SHM_HARDLOCK. When set (step 84), SHM_HARDLOCK immediately allocates and locks the required shared memory segment into physical memory 60, which may be pre-allocated in any number of desired ways (step 86). There are two effects of this. First, all physical memory required for the segment is permanently allocated until the segment is destroyed. Second, no physical pages of the segment are ever paged or swapped.

The second flag extension is SHM_VIRTWIN; it cannot be specified unless SHM_HARDLOCK is also specified (step 88). The presence of these two flags in the shmflg argument indicates to operating system 32 that all pages in the hard-locked segment are to be "virtually windowed" in accordance with the invention by all processes that attach to this segment (step 90). That is, the region of virtual address space created as part of the overall method (FIG. 5, step 72), when attaching to a shared memory segment with these flags set, will act as a "window." Any number of virtual pages within that window can be dynamically remapped (FIG. 5, step 74) to address any specific pages within the (typically much larger) underlying shared segment.

The shmget system call returns the shared memory identifier shmid associated with the shared memory region (step 92). This identifier is globally available to other processes with the appropriate user and group-ID credentials.

The presence of SHM_VIRTWIN in shmfig causes shmget to treat the size argument as the number of pages (not the number of bytes) to be contained in the resulting shared memory segment. Thus while the SHM_VIRTWIN flag can be used to create very small segments (even those comprised of a single page), its typical use is to create enormous shared memory segments often limited in size only by the physical memory of the machine such as system 10. The segment is often larger than the amount of virtual address space a process can devote to accessing the segment.

Associating the Physical Memory with the Virtual Window

Figure 7:
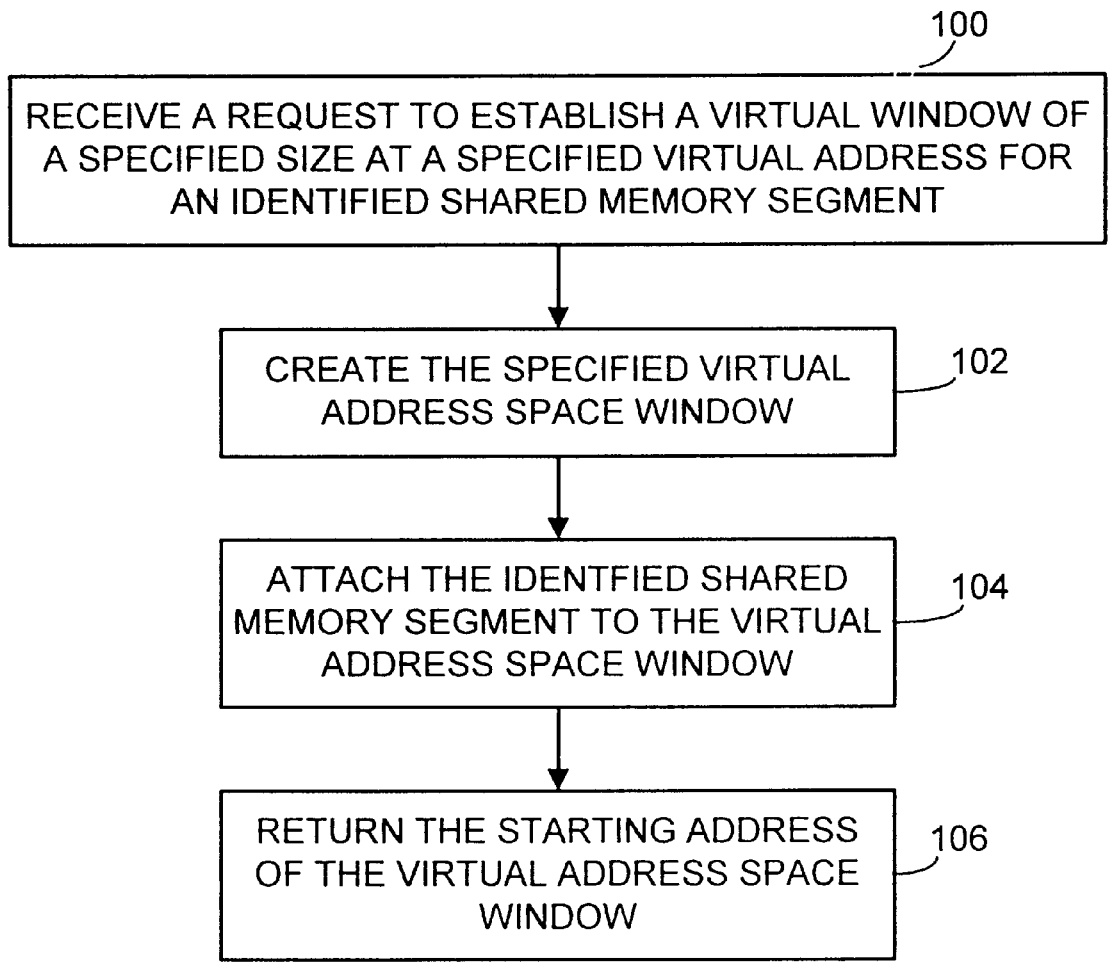
FIG. 7 is a flow chart showing in more detail a preferred method for carrying out the associating step of FIG. 5.

FIG. 7 is a flow chart showing in more detail a preferred method for carrying out the associating step of FIG. 5. The association is made in response to a system call to operating system 32 to establish a virtual window of a specified size at a specified virtual address location for an identified shared memory segment (step 100). This system call, named shmatvw in the present embodiment, allows a process via the operating system to create a virtual window (step 102) of a given size and/or location and attach it to a shared memory segment (step 104).

void *shmatvw (int shmid, void *shmaddr, int shmflg, size_t len)

The starting address of the virtual window through which the (possibly much larger) shared memory segment is viewed (FIG. 5, step 74) is shmaddr, specified in the same manner as in the standard System V shmat system call. If the call is successful, the operating system 32 returns this starting address to the calling process(step 106). This address is only meaningful to the calling process.

The shmatvw system call attaches the shared memory segment identified by shmid (such as segment 66) to a virtual address space window of size len bytes (such as window 62) created for the calling process. shmatvw is an extension of shmat in that the number of bytes of new virtual space created for the process is equal to len, instead of being simply the size of the shared memory segment to which the process is being attached. Furthermore, none of the address space within the created space is valid unless one or more address translations are subsequently established (FIG. 5, step 74).

Establishing an Address Translation

Figure 8:
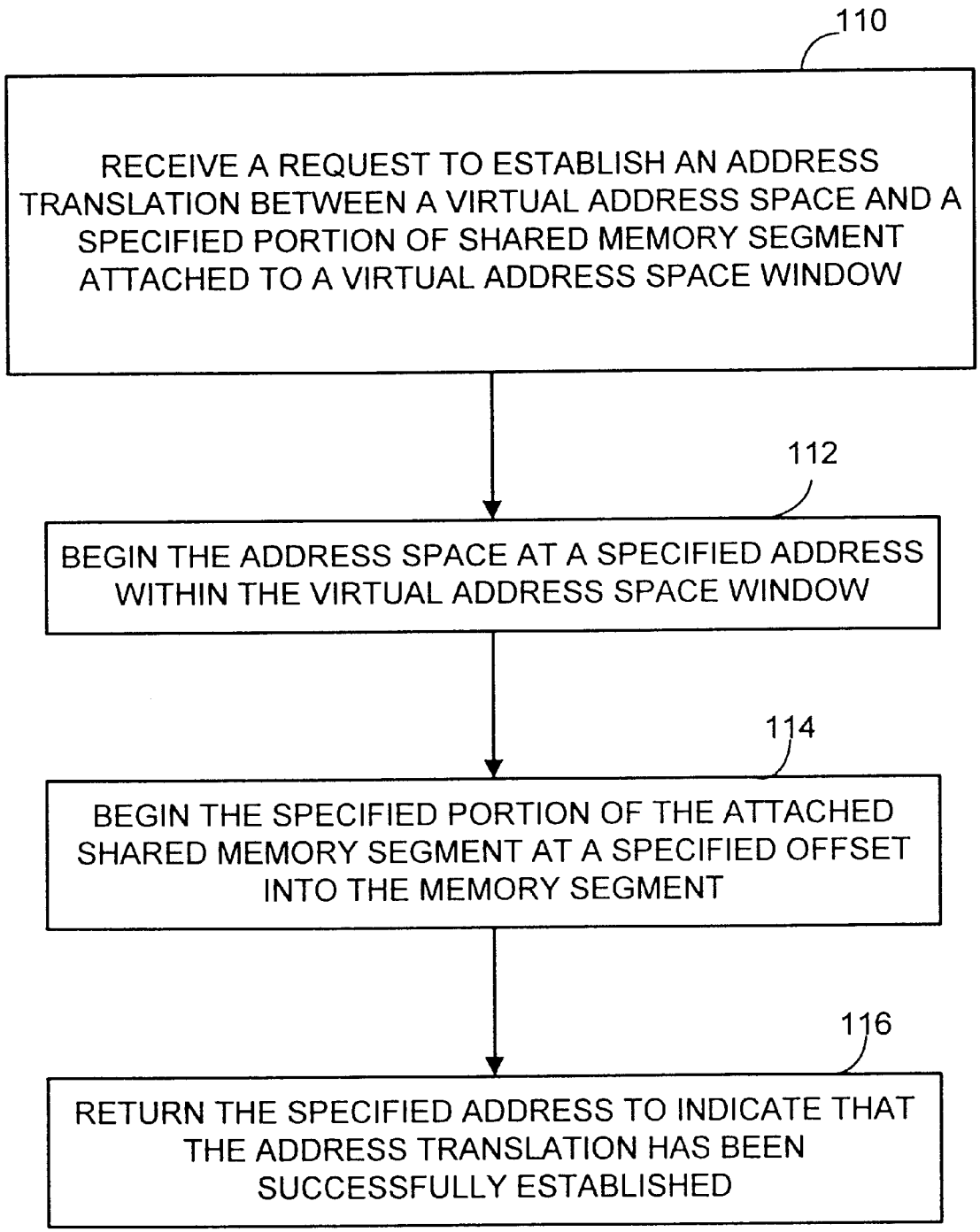
FIG. 8 is a flow chart showing in more detail a preferred method for carrying out the establishing step of FIG. 5.

FIG. 8 is a flow chart showing in more detail a preferred method for carrying out the establishing step of FIG. 5. In response to a system call by a process, operating system 32 establishes an address translation between a virtual address space and a specified portion of a shared memory segment attached to a virtual window (step 110). In the example of FIG. 4, the virtual address space is portion 64 and the virtual window is window 62.

The system call in the preferred embodiment is named virtwin and takes the following form:

void *virtwin (void *addr, size_t len, int prot, off64_t pos)

The virtwin call establishes an address translation beginning at the virtual address of addr (step 112). The translation must reference a virtual address within a virtual window such as window 62, created by a previous shmatvw system call. The given address is then mapped to the attached memory segment for len bytes within the virtual window beginning at an offset within the segment specified by argument pos (114). Any previously existing virtual address translations beginning at addr are replaced by the new address translations. For example, changing the offset position within memory segment 66 can change the address translation from segment portion 65 to segment portion 67.

All address translations created by virtwin affect only the calling process. For instance, processes which attached to the same shared memory segment via shmatvw and which subsequently created address translations via virtwin to the same underlying shared segment do not have their address translations in their virtual windows affected by the activity of other processes.

All virtual windows and address translations created within such windows remain in effect in both parent and child process after a fork( ). All exec( ) and exit( ) system calls, when successful, remove all virtual windows such as window 62 and virtually-windowed address translations such as virtual pages 64 the calling process had established.

Upon successful completion, virtwin returns the address at which the new virtually-windowed address translations (mappings) exist (step 116). This address is only meaningful to the calling process. The address returned always equals the value of the addr parameter if the translation is successful.

Using a virtually-windowed address translation, a process that attached to a shared memory segment can access an enormous shared segment, but in a much smaller amount of virtual space. The process obtains such access by mapping only the required portions of the shared memory segment as needed. Previous address translations can be redefined by any number of subsequent virtwin system calls to reference different pages of the same underlying shared segment.

Having illustrated and described principles of the invention in a preferred embodiment, it should be apparent to those skilled in the art that the preferred embodiment can be modified in arrangement and detail without departing from such principles. For example, the steps of the inventive method may be combined into fewer system calls or apportioned into additional system calls, as desired. The steps may be carried out by computer programs other than through the operating system executing in a computer. The virtual window may be smaller, larger, or identical in size to the associated physical memory, and either the window's size or location or both can be specified. The invention may be used with single processor computer systems or with other multiprocessor computer systems, with memory interconnect interfaces other than SCI, and with memory management techniques other than pages. In view of the many possible embodiments to which the principles of my invention may be applied, it should be recognized that the illustrated embodiment is only a preferred example of the invention and should not be taken as a limitation on the scope of the invention. Rather, the scope of the invention is defined only by the following claims. I therefore claim as my invention all that comes within the scope and spirit of these claims.

I claim:

1. A computer-implemented method for an application program to access physical memory in a computer, the method comprising the following steps:

associating identified physical memory with a window of virtual address space whose size and/or location is arbitrarily specified by the application program; and establishing an address translation between a portion of the windowed virtual address space and a portion of the identified physical memory, the portions being identified by the application program, the size of the virtual address space portion being variable up to the entire windowed virtual address space, as arbitrarily specified by the application program, thereby providing access to the physical memory through a virtual address.

2. The method of claim 1 wherein the size of the identified physical memory is specified as memory pages by the application program.

3. The method of claim 1 including changing the address translation between the portion of the windowed virtual address space and the portion of the identified physical memory by identifying subsequently in the application program a different physical memory portion within the physical memory.

4. The method of claim 1 wherein the identifier of the physical memory identifies a memory segment for which physical memory is allocated.

5. The method of claim 4 wherein the identified memory segment is locked into physical memory in response to a system call to identify the memory segment.

6. The method of claim 1 wherein the associating step comprises attaching the identified physical memory to a specified window of virtual address space in response to a system call.

7. The method of claim 1 wherein the establishing step comprises establishing an address translation between a specified portion of the windowed virtual address space and a specified portion of the identified physical memory in response to a system call by the application program that specifies a virtual address for the virtual address space portion, an address for the physical memory portion, and a size for the portions.

8. A computer readable medium having stored therein instructions for executing the steps of claim 1.

9. The method of claim 1 wherein the establishing step is executed by an operating system in response to a system call by an application program and the result of the system call is available only to the application program.

10. The method of claim 1 wherein the associating step is executed by an operating system in response to a system call by an application program and the result of the system call is available only to the application program.

11. A method of claim 1 wherein the physical memory is identified by an operating system in response to a system call by an application program and the result of the system call is available to other application programs.

12. A computer-implemented method of addressing physical memory, the method comprising the following steps:

in response to a first system call, identifying physical memory to be addressed;

in response to a second system call, creating a window of virtual address space of a specified size and/or location and associating the identified physical memory with the windowed virtual address space;

in response to a third system call that identifies a portion of the windowed virtual address space and a portion of the identified physical memory, establishing an address translation between the portion of the windowed virtual address space and the portion of the identified physical memory; and in response to a subsequent system call that identifies the portion of the windowed virtual address space and another portion of the identified physical memory, changing the address translation to translate between the virtual address space portion and the other physical memory portion, thereby addressing multiple portions of the identified physical memory with the same portion of the virtual address space by changing the physical memory portion identified in subsequent system calls.

13. The method of claim 12 wherein the portion of the windowed virtual address space is the entire window.

14. A computer readable medium having stored therein instructions for executing the steps of claim 12.

15. The method of claim 12 wherein the method is executed on a multiprocessor computer having shared memory distributed across multiple nodes, and the identifying step comprises identifying a memory segment for which physical memory is allocated on a specified node.

16. A computer comprising:

a central processing unit;

memory;

a first data structure contained in memory associating identified physical memory with a window of virtual address space, the window having a size and/or location arbitrarily specified by an application program being executed by the central processing unit; and a second data structure contained in memory establishing an address translation between a portion of the windowed virtual address space and a portion of the identified physical memory, the portions being identified by the application program and the size of the virtual address space portion being variable up to the entire windowed virtual address space, as arbitrarily specified by the application program.

17. The computer of claim 16 wherein the address translation established within the second data structure between the portion of the windowed virtual address space and the identified physical memory is redefinable by identifying subsequently in the application program a different physical memory portion within the physical memory.

18. The computer of claim 16 wherein the computer is a multiprocessor computer.

19. A computer-implemented method of addressing physical memory that is greater in size than available virtual address space, the method comprising the following steps:

identifying the physical memory to be addressed;

creating a virtual address space;

establishing an address translation between a virtual address space portion whose size is specified by an application program, and a portion of the identified physical memory, the locations of the virtual address space portion and physical memory portion specified by the application program; and after addressing the identified physical memory through the virtual address space, changing the address translation by changing the specified location of the physical memory portion.

20. The method of claim 19 wherein creating a virtual address space comprises creating multiple windows of virtual address space.

21. The method of claim 19 wherein establishing an address translation between a portion of the virtual address space, the portion size specified by the application program, and a portion of the identified physical memory comprises establishing address translations for multiple portions of the virtual address space.

22. A computer-readable medium having stored therein instructions for executing the steps of claim 19.

23. A computer-implemented method for an application program to access physical memory in a multiprocessor computer having shared memory distributed across a set of nodes, the method comprising:

specifying in the application program a subset of the nodes on which physical memory is located;

identifying physical memory to be addressed, the identified physical memory being on at least one of the nodes specified in the subset; and associating the identified physical memory with a window of virtual address space whose size and/or location is arbitrarily specified by the application program.

24. A computer-readable medium having stored therein instructions for executing the steps of claim 23.

* * * * *